US006776564B1

(12) United States Patent
Kiernan et al.

(10) Patent No.: US 6,776,564 B1
(45) Date of Patent: Aug. 17, 2004

(54) VERTICALLY PIVOTING WHEELCHAIR RESTRAINT

(75) Inventors: David G. Kiernan, Coatesville, PA (US); Richard A. Watts, Bernville, PA (US)

(73) Assignee: USSC Group Inc., West Conschohocken, PA (US)

( * ) Notice: Subject to any disclaimer, the term of this patent is extended or adjusted under 35 U.S.C. 154(b) by 0 days.

(21) Appl. No.: 09/669,682

(22) Filed: Sep. 26, 2000

(51) Int. Cl.[7] .................... B60P 7/08
(52) U.S. Cl. .................... 410/23; 410/4; 410/7; 410/12; 410/18
(58) Field of Search .................... 410/3, 4, 7, 10, 410/11, 12, 19, 22, 23, 100, 103, 18; 248/499; 296/65.04; 280/304.1

(56) References Cited

U.S. PATENT DOCUMENTS

| | | | |
|---|---|---|---|
| 1,436,435 | A | 11/1922 | Cooney |
| 1,780,317 | A | 11/1930 | Snyder |
| 3,955,847 | A | 5/1976 | Schiowitz |
| 4,019,752 | A | 4/1977 | Leon et al. |
| 4,093,303 | A | 6/1978 | Nelson |
| 4,103,934 | A | 8/1978 | Arnholt et al. |
| 4,113,270 | A | 9/1978 | Barecki |
| 4,221,396 | A | 9/1980 | Kehl |
| 4,246,984 | A | 1/1981 | Seay et al. |
| 4,257,644 | A | 3/1981 | Stephens |

(List continued on next page.)

FOREIGN PATENT DOCUMENTS

| | | | |
|---|---|---|---|
| DE | 3927736 | A1 | 2/1991 |
| FR | EPO 0 437 413 | A1 | 1/1991 |
| GB | 2 188 292 | A | 9/1989 |
| WO | WO 98/19884 | | 5/1998 |

OTHER PUBLICATIONS www.access–board.gov/trans/vguide.htm, Part 1192—Americans with Disabilities Act (ADA) Accessibility Guidelines for Transportation Vehicles, (Printed: Dec. 29, 1999), 33 pages.

Wheelchair Tiedown and Occpant Restraint Systems For Use In Motor Vehicles, SAE, The Engineering Society For Advancing Mobility—Land Sea Air and Space International, Document #SAE J2249, Issued Oct. 1996, pp. 1–43.

Mobility Aid Securement and Occupant Restraint (MASOR) Systems for Motor Vehicles, Prepared by Canadian Standards Association, published Dec. 1995, pp. 1–35.

ISO/CD 10542–1 Feb. 1998, International Organisation For Standardisation, Wheelchairs Tiedowns and occupant restraint systems for motor vehicles, pp. 1–43.

ISO/CD 10542–2 Feb. 1998, International Organisation For Standardisation, Wheelchairs Tiedowns and occupant restraint systems for motor vehicles, pp. 1–7.

American Seating & IMMI Secur ity Systems advertisement for Transportation Vehicle Wheelchair Tie–Down & Occupant Restraint Systems, Restraint Systems, 2 pages ©1996.

*Primary Examiner*—Stephen T. Gordon
(74) *Attorney, Agent, or Firm*—Blank Rome LLP

(57) ABSTRACT

A wheelchair restraint has four primary components: a base assembly, two pivot members or arms, hinges and belt assemblies. The base assembly is used to mount the restraint to a vehicle. The arms are connected to the base assembly and each retain a belt assembly via a respective hinge. The arms pivot from a horizontal operating position about a horizontal axes to a vertical storage position. The vehicle restraint allows an operator to quickly and easily secure or release a passenger in a wheelchair, while maintaining the integrity of the straps/belts and prolonging strap/belt life by storing the straps/belts out of the range of the elements that would otherwise deteriorate them. In the storage position, the area can be used by other passengers not requiring securement and remain out of the way during wheelchair ingress and egress.

31 Claims, 4 Drawing Sheets

U.S. PATENT DOCUMENTS

| | | | | | |
|---|---|---|---|---|---|
| 4,325,576 | A | | 4/1982 | Guthrie | |
| 4,369,995 | A | | 1/1983 | Harder, Jr. | |
| 4,389,056 | A | | 6/1983 | Tenniswood | |
| 4,421,189 | A | | 12/1983 | Watkins et al. | |
| 4,422,455 | A | | 12/1983 | Olsen | |
| 4,427,210 | A | | 1/1984 | Wevers | |
| 4,457,551 | A | | 7/1984 | Anthony | |
| 4,475,762 | A | | 10/1984 | DeLong | |
| 4,492,403 | A | | 1/1985 | Blomgren et al. | |
| 4,511,171 | A | | 4/1985 | Petersen | |
| 4,520,893 | A | | 6/1985 | Keough | |
| 4,588,340 | A | | 5/1986 | Howard | 410/7 |
| 4,593,929 | A | | 6/1986 | Williams | |
| 4,601,620 | A | * | 7/1986 | Bugger et al. | 410/22 |
| 4,623,289 | A | | 11/1986 | Apostolos | 410/7 |
| 4,664,584 | A | | 5/1987 | Braun et al. | |
| 4,688,843 | A | | 8/1987 | Hall | |
| 4,728,150 | A | | 3/1988 | Gaudreau, Jr. | |
| 4,730,964 | A | | 3/1988 | Joyner | 410/23 |
| 4,754,987 | A | | 7/1988 | Williams | |
| 4,763,952 | A | | 8/1988 | Gaudreau, Jr. | |
| 4,772,164 | A | * | 9/1988 | McFarland | 410/3 |
| 4,804,308 | A | | 2/1989 | Hamblin et al. | |
| 4,826,193 | A | | 5/1989 | Davis | |
| 4,842,458 | A | | 6/1989 | Carpenter | 410/3 |
| 4,886,403 | A | | 12/1989 | Gresham | 410/10 |
| 4,971,341 | A | | 11/1990 | Magnuson | |
| 4,979,779 | A | | 12/1990 | Williams | |
| 4,995,775 | A | | 2/1991 | Gresham | 410/10 |
| 5,007,118 | A | | 4/1991 | Ebersole | |
| 5,026,225 | A | | 6/1991 | McIntyre | 410/23 |
| 5,042,878 | A | | 8/1991 | Collins | |
| 5,044,847 | A | * | 9/1991 | Saunders et al. | 410/101 |
| D328,646 | S | | 8/1992 | Klearman et al. | |
| D329,834 | S | | 9/1992 | Miller | |
| 5,186,585 | A | * | 2/1993 | Sousa et al. | 410/9 |
| 5,259,081 | A | | 11/1993 | Henderson | |
| 5,344,265 | A | | 9/1994 | Ullman et al. | 410/3 |
| 5,391,030 | A | | 2/1995 | Lee | 410/12 |
| 5,431,524 | A | | 7/1995 | Antal et al. | |
| 5,489,170 | A | | 2/1996 | Inoue et al. | 410/7 |
| 5,567,095 | A | | 10/1996 | James et al. | 410/7 |
| 5,626,397 | A | | 5/1997 | Reid | |
| 5,823,723 | A | | 10/1998 | Finch | 410/22 |
| 5,888,038 | A | | 3/1999 | Ditch et al. | 410/7 |
| 6,095,731 | A | * | 8/2000 | Minakami et al. | 410/20 |
| 6,113,325 | A | * | 9/2000 | Craft | 410/7 |
| 6,149,359 | A | * | 11/2000 | Cardona | 410/11 |
| 6,171,035 | B1 | * | 1/2001 | McLaurin et al. | 410/7 |
| 6,287,060 | B1 | * | 9/2001 | Girardin | 410/7 |

* cited by examiner

FIG. 1
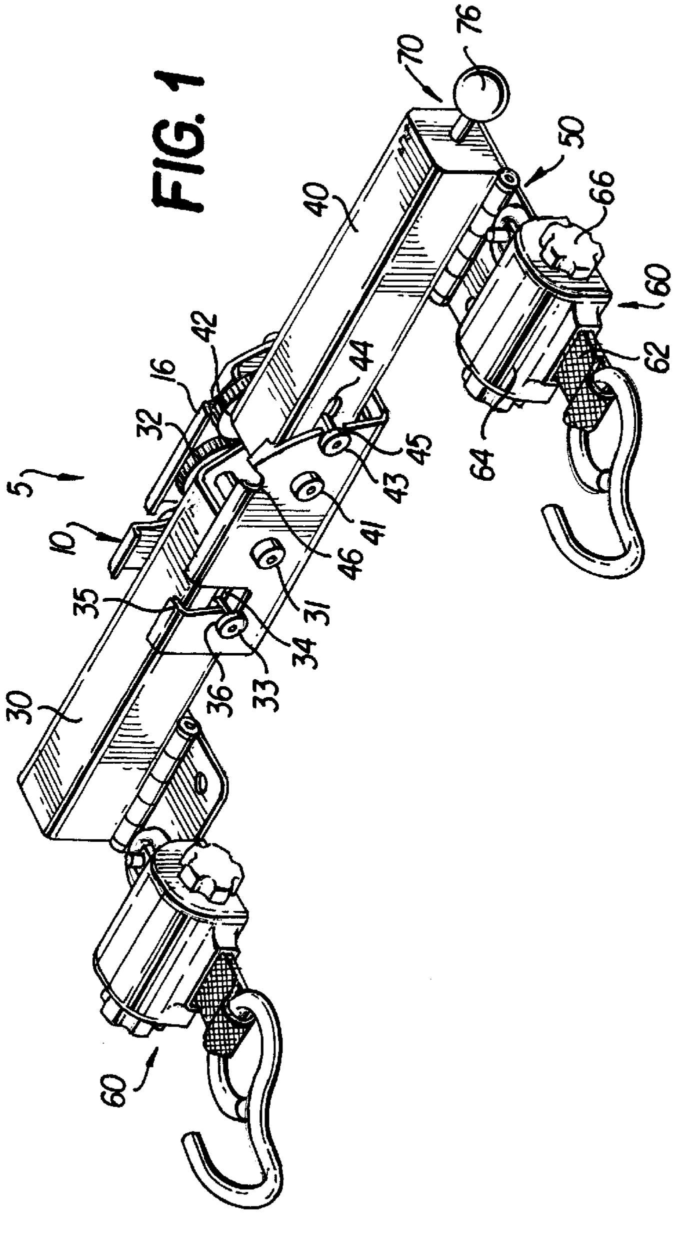
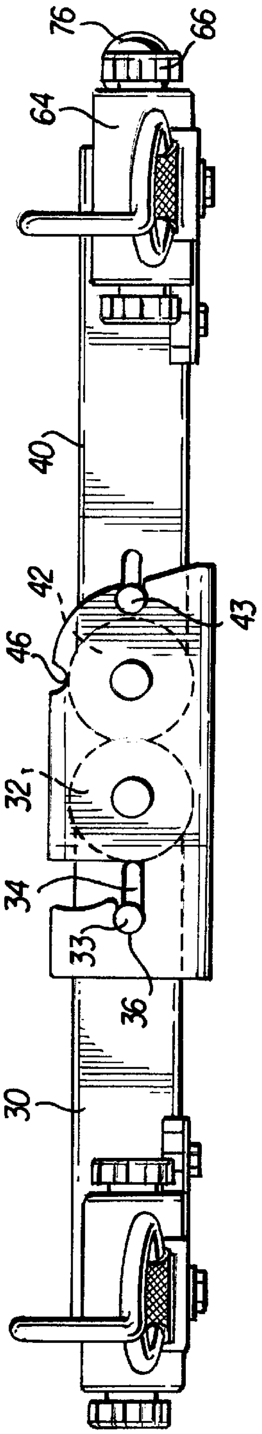
FIG. 2

VERTICALLY PIVOTING WHEELCHAIR RESTRAINT

BACKGROUND OF THE INVENTION

1. Field of the Invention

The present invention relates to a wheelchair restraint for use in a vehicle. More particularly, the present invention relates to a wheelchair restraint that pivots from a horizontal operating position to a vertical storage position for easy storage, and especially for storage under seats of a transportation vehicle such as a bus, train or the like.

2. Description of the Related Art

Governmental regulations require wheelchairs to be secured during use on transportation vehicles, such as buses and trains. Wheelchair restraints have been developed that limit movement of wheelchairs during use on transportation vehicles. These restraints are typically mounted to the vehicle and provide belts or straps that are fastened to the wheelchair. However, these restraints are often bulky or awkward and difficult to use. Accordingly, a wheelchair restraint is needed that does not interfere with the ingress and egress of the wheelchair and is able to be placed out of the way when not in use. In addition, a wheelchair restraint is needed that does not twist or bend the belts or straps when in use, thereby reducing wear and tear on the belts and straps.

SUMMARY OF THE INVENTION

In view of the foregoing, one object of the present invention is to provide a wheelchair restraint for use on transportation vehicles. It is a further object of the present invention to provide a wheelchair restraint that does not interfere with the ingress and egress of the wheelchair. It is yet another object of the invention to provide a wheelchair restraint that can be placed in a storage position out of the way of passengers when not in use. It is yet another object of the invention to provide a wheelchair restraint that is not complex in structure, but is durable and easy to use.

In accordance with these and other objectives, the wheelchair restraint of the present invention generally has four primary components: a base assembly, two pivot members or arms, hinges and belt assemblies. The base assembly is used to mount the restraint to a vehicle. The arms are connected to the base assembly and each retain a belt assembly connected by a respective hinge. The arms pivot from a horizontal operating position about horizontal axes to a vertical storage position.

The vehicle restraint allows an operator to quickly and easily secure or release a passenger in a wheelchair, while maintaining the integrity of the straps/belts and prolonging strap/belt life by storing the straps/belts out of the range of the elements that would otherwise deteriorate them. In the storage position, the area can be used by other passengers not requiring securement and remain out of the way during wheelchair ingress and egress.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 1 is a perspective view of the restraint in an operating position in accordance with the preferred embodiment of the invention;

FIG. 2 is a side view of the restraint in the operating position;

DETAILED DESCRIPTION OF THE PREFERRED EMBODIMENTS

Figure 3:
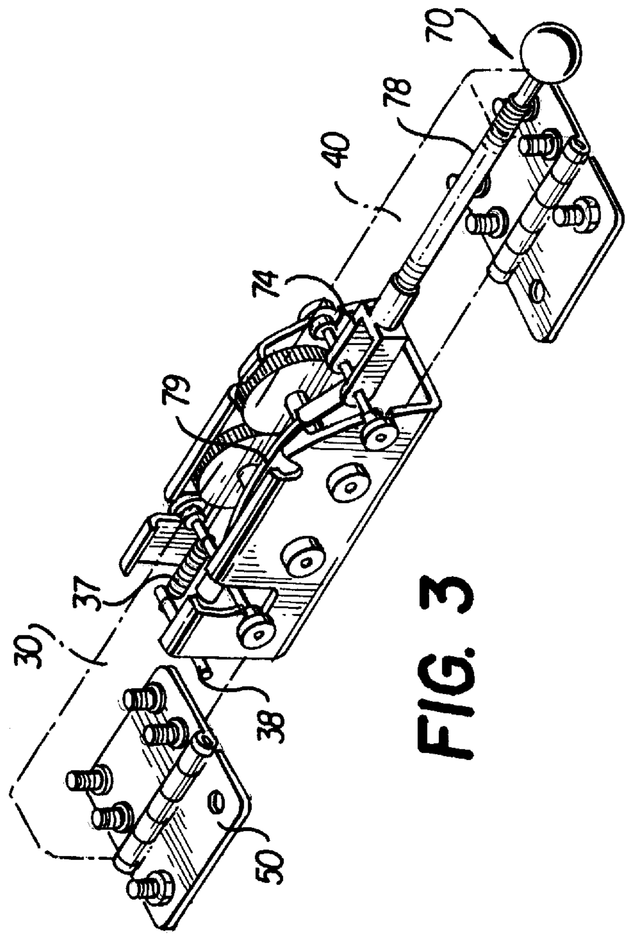
FIG. 3 is a cut-away perspective of the restraint in the operating position.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 4:
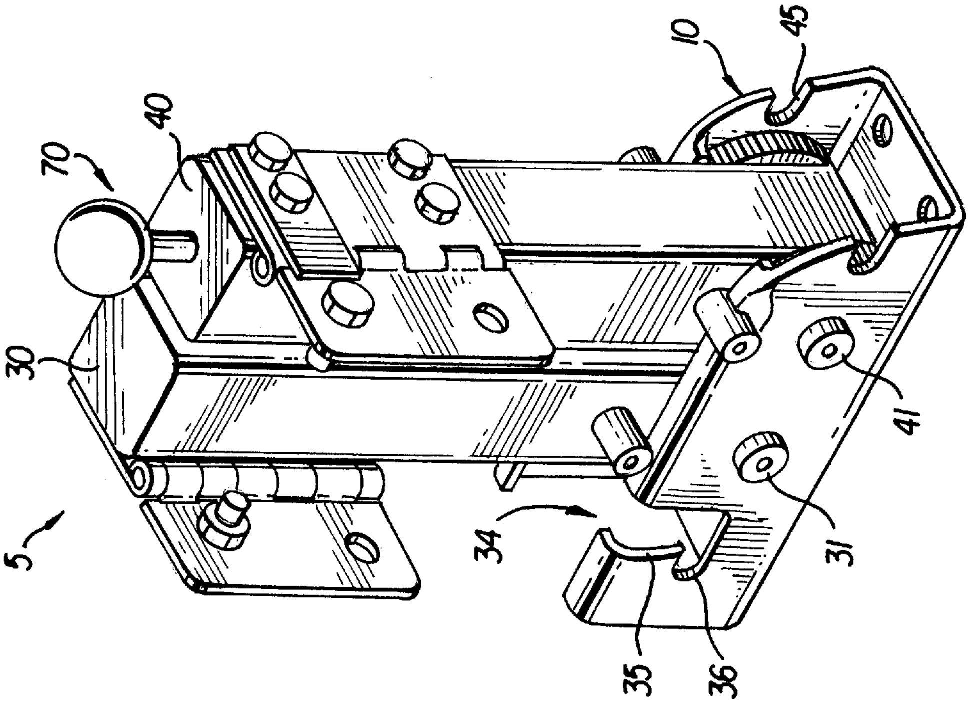
FIG. 4 is a perspective of the restraint in a storage position.

Turning to the drawings, FIG. 1 shows the overall vehicle wheelchair restraint 5 of the present invention. The wheelchair restraint 5 generally has four primary components: a base assembly 10, two pivot members or arms 30, 40, hinges 50 and belt assemblies 60. The base assembly 10 is used to mount the restraint 5 to a vehicle (see FIG. 5). The arms 30, 40 are connected to the base assembly 10 and each retain a belt assembly 60 connected by a respective hinge 50. The arms 30, 40 pivot from a substantially horizontal operating position about horizontal axes (FIGS. 1–3) to a substantially vertical storage position (FIG. 4).

The vehicle restraint 5 allows an operator to quickly and easily secure or release a wheelchair, while maintaining the integrity of the straps/belts and prolonging the lives of straps/belts 62 of belt assembly 60 by storing the belts 62 out of the range of the elements that would otherwise deteriorate them. In the storage position, the area can be used by other passengers not requiring securement and remain out of the way during wheelchair ingress and egress.

The base assembly 10 is preferably a single U-shaped member formed by a base plate 12 and two upright wall portions 14, 16 formed on opposite sides of the base plate 12. The base plate 12 has four mounting holes 18 that receive bolts for securing the base plate 12, and thereby the retaining device 5, to the floor of a transportation vehicle. The two upright side wall portions 14, 16 cooperate with the arms 30, 40 to enable the arms 30, 40 to pivot between the operating and storage positions and also allow the arms 30, 40 to be locked at each position.

Each arm 30, 40 has a first opening for receiving a pivot pin 31, 41. The pivot pins 31, 41 extend through an opening in a first side wall 14, 16, through the first opening in the respective arm 30,40, to an opening in the opposite side wall 14, 16. The pivot pins 31,41 are secured in position by a fastener at each end of the pin. The pivot pins 31, 41 enable the arms 30, 40 to rotate between the horizontal operating position and the vertical storage position.

Gears 32, 42 are provided toward the end of each arm 30, 40 that is secured to the base assembly 10. Preferably, two gears 32, 42 are secured to each arm 30, 40, one gear on each side of the arm 30, 40 so that when the arms 30, 40 are connected to the base assembly 10, the gears 32, 42 extend along the side walls 14, 16. Each gear 32, 42 is secured to arms 30, 40 by three screws and the pivot pin 31, 41 passes through the center of the gear 32, 42 so that the center of the gears 32, 42 forms the pivot point for the respective arms 30, 40.

The gears 32, 42 cooperate with one another to provide synchronous movement and locking of the arms 30, 40. Thus, as one arm 30, 40 is raised or lowered, the other arm 30, 40 will have a corresponding movement. Accordingly, an operator need only move one arm 30, 40 in order to operate both arms 30, 40. In addition, if one arm 30, 40 is locked in position, the other arm will also be locked by virtue of the gears 32, 42. The synchronous operation of the arms 30, 40 also enables the operator to use the retainer device 5 with a single hand.

The arms 30, 40 have slots 34, 44 that receive respective locking pins 33, 43. The slots 34, 44 extend longitudinal with respect to the arms 30, 40 and allow the locking pins 33, 43 to engage and release the side walls 14, 16 of the base assembly 10, thereby operatively locking the arms 30, 40 to the base assembly 10.

The side walls 14, 16 of the base assembly 10 have two sets of notches 45, 46 at a front end (shown toward the right in FIGS. 1–4) of the side walls 14, 16 of the base assembly 10 and a channel 35 having a detent 36 at a rear end of the side walls 14, 16 of the base assembly 10. The first notches 45 face the front (i.e., toward the operator and the inside of the vehicle) of the retainer 5 and the second notches 46 are located on the top of the side walls 14, 16. The locking pin 43 is received in the first notches 45 when the arms 30, 40 are horizontal, thereby locking the arms 30, 40 in the operating position, as shown in FIGS. 1–3. When the arms 30, 40 are raised, the locking pin 43 is received in the second notches 46, thereby locking the arms 30, 40 in the storage position, as shown in FIG. 4. The front of the side walls 14, 16 are curved to facilitate movement of the locking pin 43 between the first and second notches 45, 46.

The channel 35 is formed toward the rear of the side walls 14, 16 of the base assembly 10 to lockably receive locking pin 33. The channel 35 forms a reversed L-shaped opening that includes a detent 36 that receives the locking pin 33 when the arm 30 is in the operating position. The outside edge of the channel 35 is curved to facilitate movement of the locking pin 33 to and from the detent 36 as the arm 30 is moved between the operating and storage positions.

As best shown in FIG. 3, the locking pin 33 is spring loaded so as to be biased to engage the detent 36 when the arm 30 is in the operating position. Accordingly, when the locking pin 33 is received in the detent 36, the pin 33 remains in that position until the operator withdraws the locking pin 33 for movement to a different position. In accordance with the preferred embodiment, two springs 37 are secured to the locking pin 33 and to a retainer 38 fixedly mounted within the arm 30.

Referring back to FIG. 1, a lip is formed at the top edge of the side walls 14, 16 of the base assembly 10. The lip turns inward to slightly enclose the arms 30, 40 and gears 32, 42, but allowing the arms 30, 40 to move without interference. The lip prevents dirt, debris and clothing from entering the retainer 5 and become caught or entangled in the gears 32, 42.

A hinge 50 is secured at the outside ends of each arm 30, 40. A belt assembly 60 is bolted to each hinge 50 at an opening in the hinge 50. The hinges 50 allow upward rotation when the arms 30, 40 are in the operating position. Accordingly, the belt 62 remains aligned with the belt housing 64 and the belt 62 does not form an angle with respect to the belt housing 64 when the belt 62 is secured to a wheelchair. Preferably, the hinges 50 rotate to about 45° from horizontal.

The belt assembly 60 is bolted to the hinge 50 to allow the belt assembly 60 to rotate 180° in the horizontal plane about the bolt. Accordingly, the belt 62 remains aligned with the belt assembly 60 so that the belt 62 does not form an angle with respect to the belt housing 64 when the belt 62 is secured to a wheelchair. However, the connection provides sufficient friction to prevent the belt assembly 60 from freely rotating when not in use and thereby causing a disturbance or safety hazard. A tension knob 66 is provided on the belt assembly 60 so that the belt 62 can be tensioned when attached to the wheelchair. A release lever 68 (FIG. 1) is provided to relieve the tension when the wheelchair is to be disconnected.

The locking mechanism 70 has a control or operating shaft 72, FIG. 3. A yoke 74 is secured to one end of the control shaft 72 and a knob 76 is attached to an opposite end of the shaft 72 that extends out from the arm 40. The control shaft 72 extends through the middle of the arm 40 so that the fingers of the yoke 74 connect to the locking pin 43. Preferably, the locking pin 43 extends through holes in the fingers of the yoke 74. A spring 78 is provided to bias the control shaft 72 so that the locking pin 43 engages the notch 45 when the arms 30, 40 are in the operating position and notch 46 when the arms 30, 40 are in the storage position. The spring 78 is positioned about the control shaft 72 and compressed between a protrusion on the control shaft 72 and the end cover of the arm 40. When the operator pulls on the knob 76, the control shaft 72 withdraws the locking pin from notches 45, 46 against the force of the spring 78.

A cable 79 is connected to both of the locking pins 33, 43. Thus, when the retainer 5 is locked in the operating position, and the operator pulls on the knob 76, the locking pin 43 is withdrawn from the notches 45. The locking pin 43 pulls the cable 79 which, in turn, withdraws the locking pin 33 from the detent 36. The arms 30, 40 are thereby unlocked from the base assembly 10 and can then be raised to the storage position by simply raising the arm 40 via knob 76. The operator can release the control shaft 72 once the locking pins 43, 33 clear the respective notches 45 and detents 36. The locking pin 43 will slide along the curved front of the side walls 14, 16 and the locking pin 33 will rest or slide along the outer curved edge of the channel 35.

When the arms 30, 40 reach the storage position, and the knob is released, locking pin 43 engages the notches 46 under force of spring 78. In the storage position, the locking pin 33 is withdrawn from the channel 35 and the cable 79 is not tensioned. A snapping noise is made by the locking pin 43 as it engages the base assembly 10, so that the operator knows the retainer device 5 is locked in the storage position.

Similarly, to move the arms 30, 40 from the storage position to the operating position, the operator pulls on knob 76. The control shaft 72 withdraws the locking pin 43 from the notches 46 and the arms 30, 40 are thereby released from the base assembly 10. The arms 30, 40 can then be moved toward the operating position, and the operator can release the knob 72 once the locking pin 43 moves beyond the notches 46. When the arms 30, 40 reach the operating position, the locking pins 33, 43 respectively engage the detents 36 and notches 45 under force of springs 37 and 78. A snapping noise is made by the locking pins 33, 43 as they engage the base assembly 10, so that the operator knows the retainer device 5 is locked in the operating position.

Figure 5:
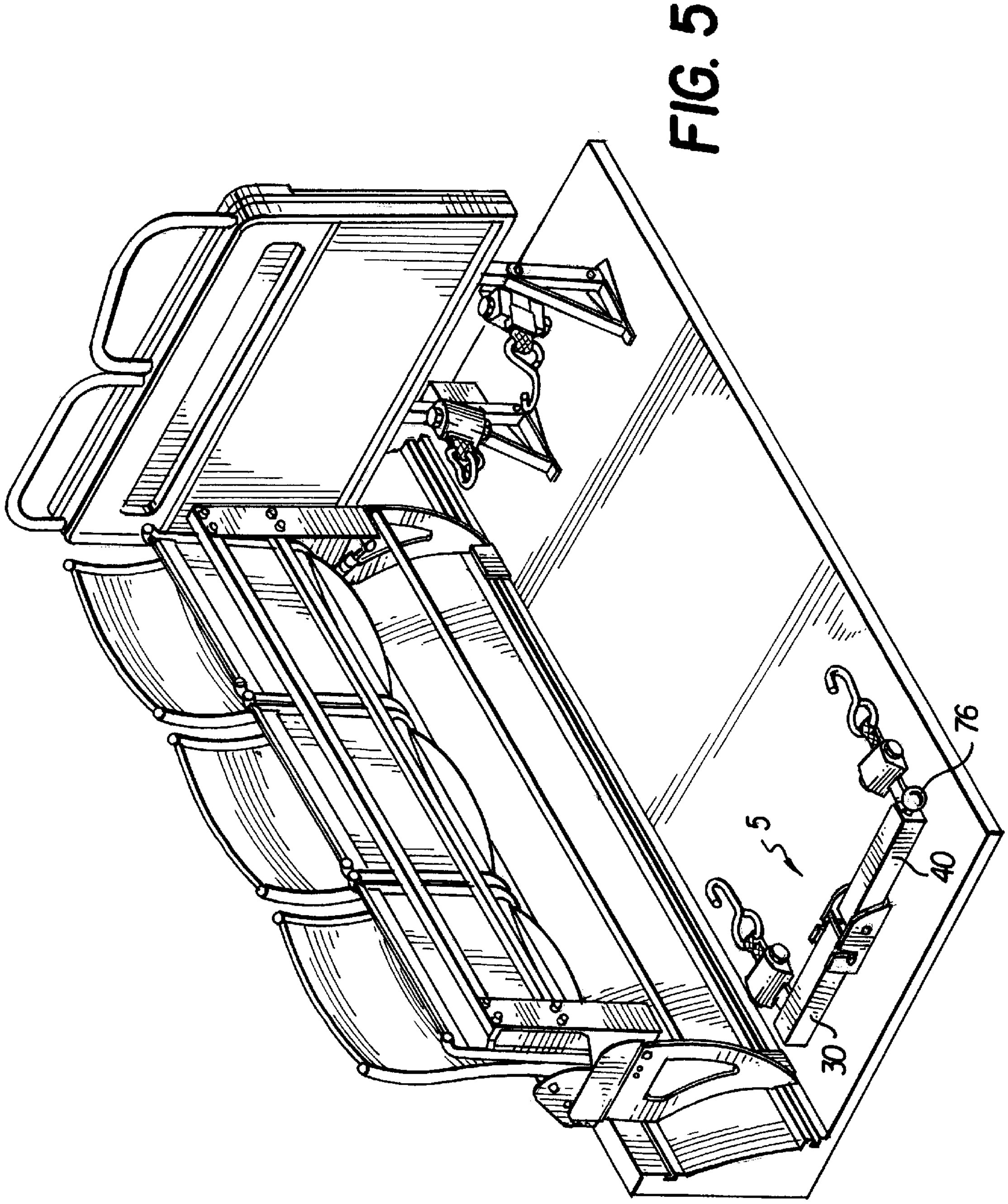
FIG. 5 is a perspective of the restraint secured to a vehicle.

As shown in FIG. 5, the retainer device 5 can be placed at the front and/or rear of a wheelchair that is to be retained.

The release knob 76 should be positioned for easy access by the operator. In the preferred embodiment, the retainer 5 is positioned toward a side of the vehicle with the release knob 76 facing inward. The retainer device 5 is first placed (and locked) in the storage position to enable ingress of the wheelchair. Once the wheelchair is positioned, the retainer device 5 is locked into the operating position. The belts 62 are connected to the wheelchair by a hook fastener. When the wheelchair is to be unconnected, the belts 62 are removed and the retainer device 5 is returned to the storage position.

The retainer device 5 is mounted approximately twenty (20) inches from the side wall of the transport vehicle to the center of the restraint 5. In the storage position, the retainer device 5 is at least five (5) inches within the outer edge of a seat that folds down over the retainer device 5 so that it does not interfere with passengers when not in use. The retainer device 5 of the present invention is able to withstand up to approximately 7,300 pounds of total force in tension on the belts, with the load applied at 15° from horizontal. The restraint 5 can restrain a mass weighing 500 pounds from moving more than 2 inches in any direction given 10 g deceleration.

It should be noted that the size and number of elements are designed to comply with government regulations and are not intended to be limiting. Accordingly, the optimal number and position of arms 30, 40, locking pins 31, 41, hinges 50 and belts assemblies 60 can differ without departing from the spirit and scope of the invention. Thus, for instance, two belt assemblies may be attached to each hinge 50. In addition, any suitable device can be used to engage the arms 30, 40 with the wheelchair other than use of straps 62, such as a clamp or clasp.

Figure 6:
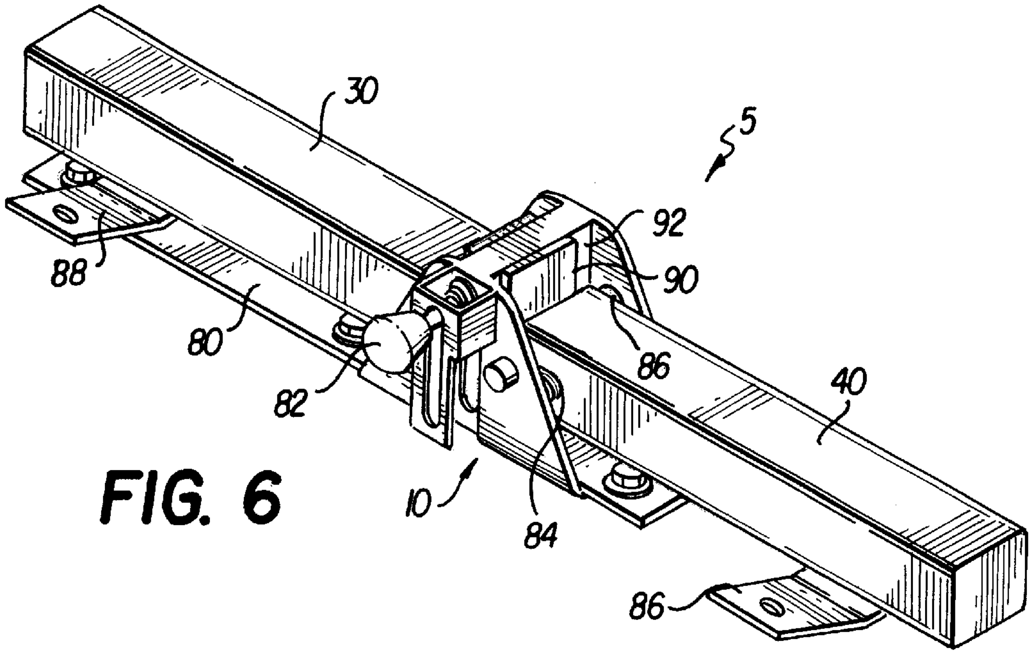
FIG. 6 is a perspective of an alternative embodiment of the restraint in the operating position; and, FIG. 7 is a perspective of the alternative embodiment of FIG. 6, with the restraint in the storage position.
Figure 7:
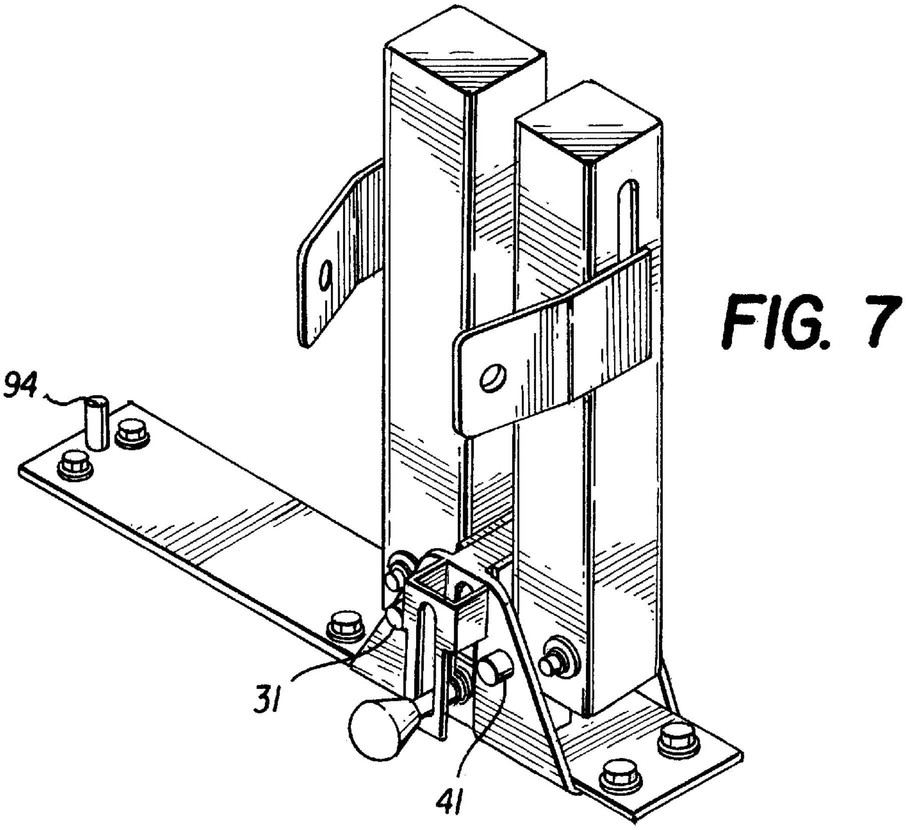

An alternative embodiment is shown in FIGS. 6 and 7, which show a restraint 5 for securing a wheelchair to a transportation vehicle, such as a bus, train or the like, using adjustable straps. The restraint 5 includes an elongated base plate 80 that is secured to the vehicle floor and two arms 30, 40 that are connected to a centrally-located, vertically translatable operator shaft. The arms 30, 40 are pivotable about a respective arm pivot pin 31, 41 by the operator shaft 82 into either an operating position (FIG. 6) or a storage position (FIG. 7), and locked into each position by the operator shaft 82.

In the operating position of FIG. 6, the arms 30, 40 are lowered and extend in opposite directions in a horizontal plane. In the storage position of FIG. 7, the arms 30, 40 are raised by operation of the operator shaft 82 into a vertical position for out-of-the-way storage during wheelchair ingress and egress to and from the vehicle and allowing the floor area of the vehicle to be used by other passengers not requiring securement. The adjustable straps are retained within housings mounted to the arms 30, 40 at connect plates 86 that extend outwardly and angled upward from the arms 30, 40.

The pivoting mechanism includes the operator shaft 82, two pivot pins 31, 41 and two J-shaped pivot plates 90, 92 that pivotably connect a respective arm 30, 40 to its pivot pin 31, 20 41 so that each securing arm 30, 40 thereby pivots about its respective pivot pin 31, 41 when caused to do so by the operator shaft 82. The base plate 80 includes front and rear flange portions 84, 86 that are vertically aligned and are opposite one another. A front flange 84 includes a vertical slot and the opposite rear flange 86 includes a first and second hole. The operator shaft 82 extends from between the vertical slot of the front flange 84 to the rear flange 86.

When the securing arms 30, 40 are in the operating position, the operator shaft 82 is in a raised position within the slot and aligns with the first hole of the rear flange 86. When the securing arms 30, 40 are in the storage position, the operator shaft 82 is in a lowered position within the slot and aligns with the second hole of the rear flange 86. The operator shaft 82 locks the arms 30, 40 in each the raised and lowered positions by engaging with the respective hole of the rear flange 86. The operator shaft 82 is biased by a spring to engage the holes, and is withdrawn under manual operation so that the arms 30, 40 may be moved between the operating and storage positions. A support member 94 can be provided on base plate 80 to support arm 30 in the operating position.

Thus, the foregoing description and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A restraint for a wheelchair comprising:

a base assembly for mounting to a floor of a vehicle;

two arm members pivotally connected to the base assembly and positionable in a horizontal operating position and a vertical storage position; and a belt assembly connected to each of said two arm members for securing the wheelchair to the wheelchair restraint.

2. The restraint of claim 1, wherein said belt assembly is rotatably connected to each of said two arm members.

3. The restraint of claim 1, said base assembly having a base plate and upwardly-extending side walls to form a generally U-shaped base assembly, each of said two arm members pivotally connected to the side walls by a pivot pin extending through an opening in each side wall and said arm member.

4. The restraint of claim 1, further comprising an engagement device for removably engaging said arm members with said base assembly in each of the operating and storage positions.

5. The restraint of claim 1, further comprising a pin extending through one of said arm members and engaging said base assembly to lock said arm member to said base assembly in each of the operating and storage positions.

6. The restraint of claim 5, further comprising a control shaft connected to said pin for disengaging said pin from said base assembly.

7. The restraint of claim 1, further comprising a gear connected to each of said two arm members, said gears engageable with one another to provide synchronous movement of each of said two arm members.

8. The restraint of claim 1, further comprising a pivot plate connected to each of said two arm members and an operating shaft to provide synchronous movement of each of said two arm members.

9. A wheelchair restraint for use in a vehicle having a floor, the restraint comprising a base directly mounted only to the floor of the vehicle, at least one member pivotally connected to said base, said at least one member having a substantially horizontal operating position and a substantially vertical storage position, and a belt connected to said at least one member.

10. A wheelchair restraint for use in a vehicle having a floor, the restraint comprising a base mounted to the floor of the vehicle, a first member and a second member each pivotally connected to said base so that said first and second members each have a substantially horizontal operating position and a substantially vertical storage position, and a first belt connected to said first member and a second belt connected to said second member.

11. A wheelchair restraint for use in a vehicle having a floor, the restraint comprising a base mounted to the floor of the vehicle, a first member and a second member each pivotally connected to said base and having an operating position and a storage position, a belt connected to each of said first and second members, and a gear connected to said first and second members to provide synchronous movement of said first and second members.

12. The restraint of claim 9, wherein said at least one member comprises an elongated arm.

13. A wheelchair restraint for use in a vehicle having a floor, the restraint comprising a base mounted to the floor of the vehicle, at least one member pivotally connected to said base and having an operating position and a storage position, and a belt connected to said at least one member, wherein said base has a base plate and upwardly-extending side walls which form a general U-shape, each said at least one member pivotally connected to the side walls.

14. The restraint of claim 9, further comprising an engagement device for removably engaging said at least one member with said base in each of the operating and storage positions.

15. A wheelchair restraint for use in a vehicle having a floor, the restraint comprising a base mounted to the floor of the vehicle, at least one member pivotally connected to said base by a first pin and having a substantially horizontal operating position and a substantially vertical storage position, a belt connected to said at least one member, and a second pin extending through said at least one member and engaging said base to removably and lockingly engage said at least one member with said base in each of the operating and storage positions.

16. A wheelchair restraint for use in a vehicle having a floor, the restraint comprising a base mounted to the floor of the vehicle, at least one member pivotally connected to said base and having an operating position and a storage position, a belt connected to said at least one member, and a pin extending through said at least one member and engaging said base to removably engage said at least one member with said base in each of the operating and storage positions, and a control shaft connected to said pin for disengaging said pin from said base.

17. A wheelchair restraint for use with a transportation vehicle, said wheelchair restraint comprising:

a base assembly for mounting to a floor of the vehicle;

a first elongated arm member pivotally connected to the base assembly at a first pivot point, said first elongated arm member having a substantially horizontal operating position and a substantially vertical storage position;

a second elongated arm member pivotally connected to the base assembly at a second pivot point, said second elongated arm member having a substantially horizontal operating position and a substantially vertical storage position; and, a first and second belt assembly respectively connected to said first and second arm members for securing the wheelchair.

18. The restraint of claim 17, wherein said first and second belt assemblies are rotatably connected to said first and second arm members, so that said first and second belt assemblies rotate with respect to said first and second arm member.

19. The restraint of claim 17, said base assembly having a base plate and upwardly-extending side walls to form a generally U-shaped base assembly, each of said first and second arm members pivotally connected to the side walls by a pivot pin extending through an opening in each side wall and said respective first and second arm member.

20. The restraint of claim 17, further comprising a mechanism to removably engage said first and second arm members with said base assembly in each of the operating and storage positions.

21. The restraint of claim 17, further comprising a mechanism having a pin extending through one of said first and second arm members and engaging said base assembly to removably engage the one of said first and second arm members to said base assembly in each of the operating and storage positions.

22. The restraint of claim 21, further comprising a control shaft connected to said pin for disengaging said pin from said base assembly.

23. The restraint of claim 17, further comprising a first gear connected to the first arm member and a second gear connected to said second arm member, slid first gear engageable with said second gear to provide synchronous movement of said first and second arm members.

24. A wheelchair restraint for use with a vehicle comprising a base member, two elongated arms pivotally connected to the base member to extend outwardly in opposite directions relative to each other from the base member said base member being centrally located with respect to the elongated arms, and an engagement device attached to each elongated arm for engaging a wheelchair.

25. The wheelchair restraint of claim 24, wherein said engagement device comprises a belt.

26. The wheelchair restraint of claim 24, wherein said elongated arms pivot between a storage position and an operating position in which said elongated arms extend outwardly from the base member, whereby the restraint is more horizontally compact in the storage position than in the operating position.

27. The wheelchair restraint of claim 24, wherein said engagement device comprises a separate element attached to each elongated arm.

28. The restraint of claim 3, wherein said two arm members are positioned at opposite ends of said base assembly between the side walls thereof.

29. The restraint of claim 1, wherein said two arm members comprise a first arm member pivotally connected to said base assembly and a second arm member pivotally connected to said base assembly.

30. The restraint of claim 29, wherein said first arm member is pivotally connected to said base assembly with a first pivot at a first position and said second arm member is pivotally connected to said base assembly with a second pivot at a second position.

31. The restraint of claim 13, further comprising a pivot pin extending through an opening in each side wall and said at least one member, said pivot pin pivotally connecting said at least one member to the side walls.

* * * * *